United States Patent [19]
Al-Salameh et al.

[11] Patent Number: 6,075,629
[45] Date of Patent: Jun. 13, 2000

[54] OPTICAL PROTECTION SWITCH EMPLOYING AN INTERFERENCE FILTER

[75] Inventors: Daniel Yousef Al-Salameh, Marlboro; Nathan Myron Denkin, Aberdeen; Wei-Chiao William Fang, Middletown; Maria F. Mendez, Elizabeth, all of N.J.

[73] Assignee: Lucent Technologies Inc., Murray Hill, N.J.

[21] Appl. No.: 09/014,174

[22] Filed: Jan. 27, 1998

[51] Int. Cl.[7] .................................................. H04B 10/18
[52] U.S. Cl. ........................ 359/110; 359/133; 359/154; 359/161
[58] Field of Search ................................. 359/133, 110, 359/161

[56] References Cited

U.S. PATENT DOCUMENTS

| | | | |
|---|---|---|---|
| 4,044,307 | 8/1977 | Borysiewicz et al. | 325/42 |
| 5,949,796 | 9/1999 | Kumar | 370/529 |

*Primary Examiner*—Jason Chan
*Assistant Examiner*—Vu Lieu
*Attorney, Agent, or Firm*—Frederick Luludis

[57] ABSTRACT

A bi-directional protection facility is provided in an optical communication system in which an optical communications node communicates with another optical communications node via first and second bi-directional communications paths respectively serving as a service path and protection path, and in which a filter at each node processes signals respectively received over the service and protection paths and generates an in-band signal and out-of-band signal for each of the paths. A control unit then generates a Loss of Signal indication for the service path if the level of the out-of-band signal is found to be greater than the level of the in-band signal and protection switching is effectuated as a function of the presence of the control signal. In addition, an outgoing signal to the other communications node is interrupted for a sufficient period of time to cause a LOS at that node and thus trigger protection switching thereat to complete the bi-directional switching process.

16 Claims, 5 Drawing Sheets

OPTICAL PROTECTION SWITCH EMPLOYING AN INTERFERENCE FILTER

FIELD OF THE INVENTION

The invention relates to optical switching and more particularly relates to a path protection feature for an optical switch.

BACKGROUND OF THE INVENTION

It is well-known that a provider/operator of a communications network strives to increase the level of "survivability" of the network whenever a fault occurs, e.g., a loss of signal is detected over a communications path. The operator typically increases the level of survivability by employing a protection-switching architecture to recover from a loss of signal condition. Protection switching, as it is commonly referred to, involves establishing preassigned backup resources, e.g., a duplicated/standby communications path, which may be switched into service when a loss of signal occurs.

The detection of a loss of signal is usually done simply by comparing the level of an optical signal received via a communications path with a predetermined threshold. If the level of the received optical signal is continuously below the threshold for a predetermined period of time, then protection switching may be triggered for that communications path.

It appears, however, that with the increasing deployment of Wavelength Division Multiplexing (WDM) and optical amplifiers in an optical network, the detection of a Loss of Signal (LOS) becomes more complicated. The reason for this is that an optical amplifier in a path which is experiencing an LOS may not immediately reduce its output power. As a result, the level of the received signal may not significantly change until each optical amplifier reduces its output power. Disadvantageously, user data may be lost, since a substantial amount of time, e.g., 50 milliseconds, may be exhausted before the LOS is detected.

The detection of a LOS is further complicated if the optical signal is composed of a plurality of optical signals of different wavelengths $\lambda_i$.

SUMMARY OF THE INVENTION

We deal with the foregoing amplifier problem, in accordance with an aspect of the invention, by dividing the received power into a number of wavelength bands——illustratively two bands——in which one band contains all of the signal wavelengths and the other band contains only the amplifier noise. Thus, when signals are present, then the power ratio of the two bands is different from when signals are not present. Accordingly, changes in the ratio can be quickly determined to identify the presence or absence of a LOS.

Advantageously, protection switching can be invoked rapidly, typically within 10 milliseconds from the detection of a LOS, all in accordance with the principles of the invention.

These and other aspects of the invention will become apparent from the following detailed description and accompanying drawing.

GENERAL DESCRIPTION

The following is a brief general description of the principles of the invention. It will be followed by a more detailed description. Note that the term Loss Of Signal is defined herein as a loss of all optical channels or the equivalent thereof. (It is to be understood, however, that the invention may be used in situations where only one or a few of a number of optical channels have been lost, as will be appreciated from the following detailed description.)

The operational procedure that is followed to detect a Loss of Signal on an incoming, active communications path includes dividing a path connecting to the communications path into two bands respectively referred to herein as the "in-band" and "out-band". The protection (or inactive) communications path "backing up" the incoming, active communications path is similarly divided. We then determine the power ratio, $\rho_s$ and $\rho_p$, for the in-band/out-band ratio. If $\rho_s \geq \rho_{limit}$ (at least equals a predetermined limit, then the detector concludes that a signal is being received from the incoming communications path. If $\rho_s < \rho_{limit}$ occurs for more than some predetermined duration of time, e.g., two milliseconds, then a LOS is declared, thereby invoking the protection switching process.

The switching process, more particularly, includes driving a 2×1 switch into a protection state to activate the incoming protection path and deactivate the incoming active path. For bi-directional switching, the outgoing active path is disrupted for a sufficient period of time, e.g., 4 seconds, to cause a LOS at the opposite end of that path, and to cause equipment thereat to declare a LOS and invoke protection switching at that end of the transmission path, thereby completing the bi-directional protection switching process.

Thereafter, if an LOS occurs on the protection path, which is now in service, and the LOS is detected in the foregoing manner, then the system, in accordance with an aspect of the invention, will switch to the non-protection path if it is available for service. In addition, the system disrupts the signals that are being delivered to the opposite/far end via the outgoing protection path to cause the far end to switch back to the non-protection path.

DETAILED DESCRIPTION

Figure 1:
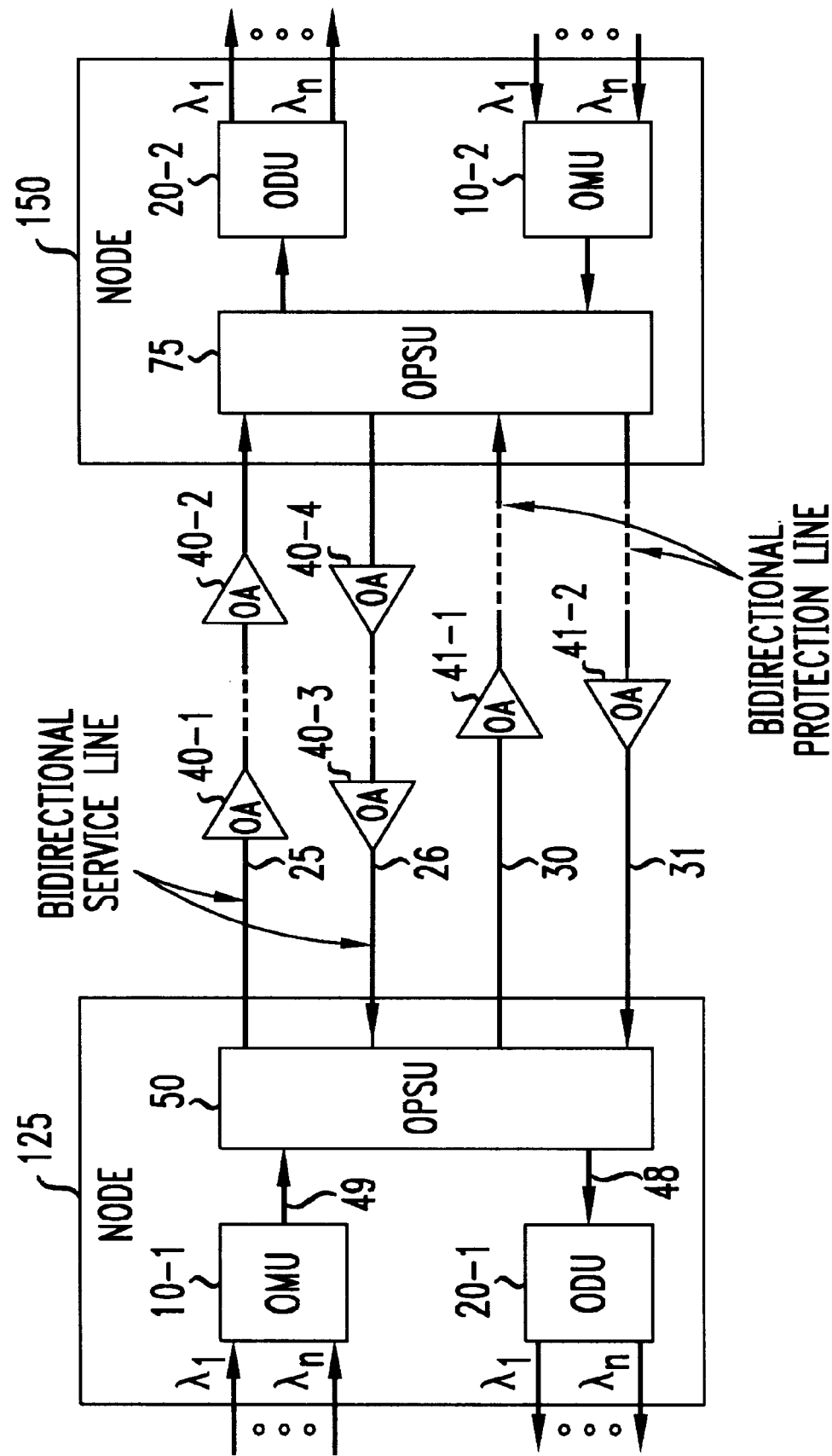
FIG. 1 is a broad block diagram of an optical transmission system employing protection switching arranged in accordance with the principles of the invention.

An optical communications system employing the principles of the invention to discern a LOS is illustrated in FIG. 1, in which optical transmission system 100 includes optical nodes 125 and 150. An optical node, e.g., node 125, includes, among other things, a conventional Optical Multiplexing Unit (OMU) 10-1 which multiplexes a plurality of optical signals of different wavelengths onto an optical carrier signal. OMU 10-1 then supplies the multiplexed carrier to Optical Protection Switch Unit (OPSU) 50, which may be, e.g., a so-called Dense Wavelength Division Multiplexed System (DWDM). It is seen from FIG. 1, that OPSU 50 connects to a bi-directional service line formed by bi-directional service paths 25 and 26. It also connects to a bi-directional protection line formed from bidirectional paths 30 and 31. For the time being, assume that traffic is being sent and received via in-service lines 25 and 26. Then, OPSU 50 outputs the carrier signal that it receives from OMU 10-1 to line 25 for transmission to node 150. Similarly, node 150 outputs an optical carrier signal that it receives from OMU 10-2 to line 26 for transmission to node 125. Optical carrier signals that OPSU 50 receives from line 26 are supplied to conventional Optical Demultiplexing Unit (ODU) 20-1, which, in turn, demultiplexes the received signal into a plurality of signals of different wavelengths which formed the signal that was received at node 150. OPSU 75 and ODU 20-2 operate similarly with respect to signals received via path 25. It seen that the rn-service lines 25 and 26 include optical amplifiers 40-i and 40-4, respectively, which, as discussed above, makes it difficult to detect a LOS occurring on either line 25 or 26.

Figure 2:
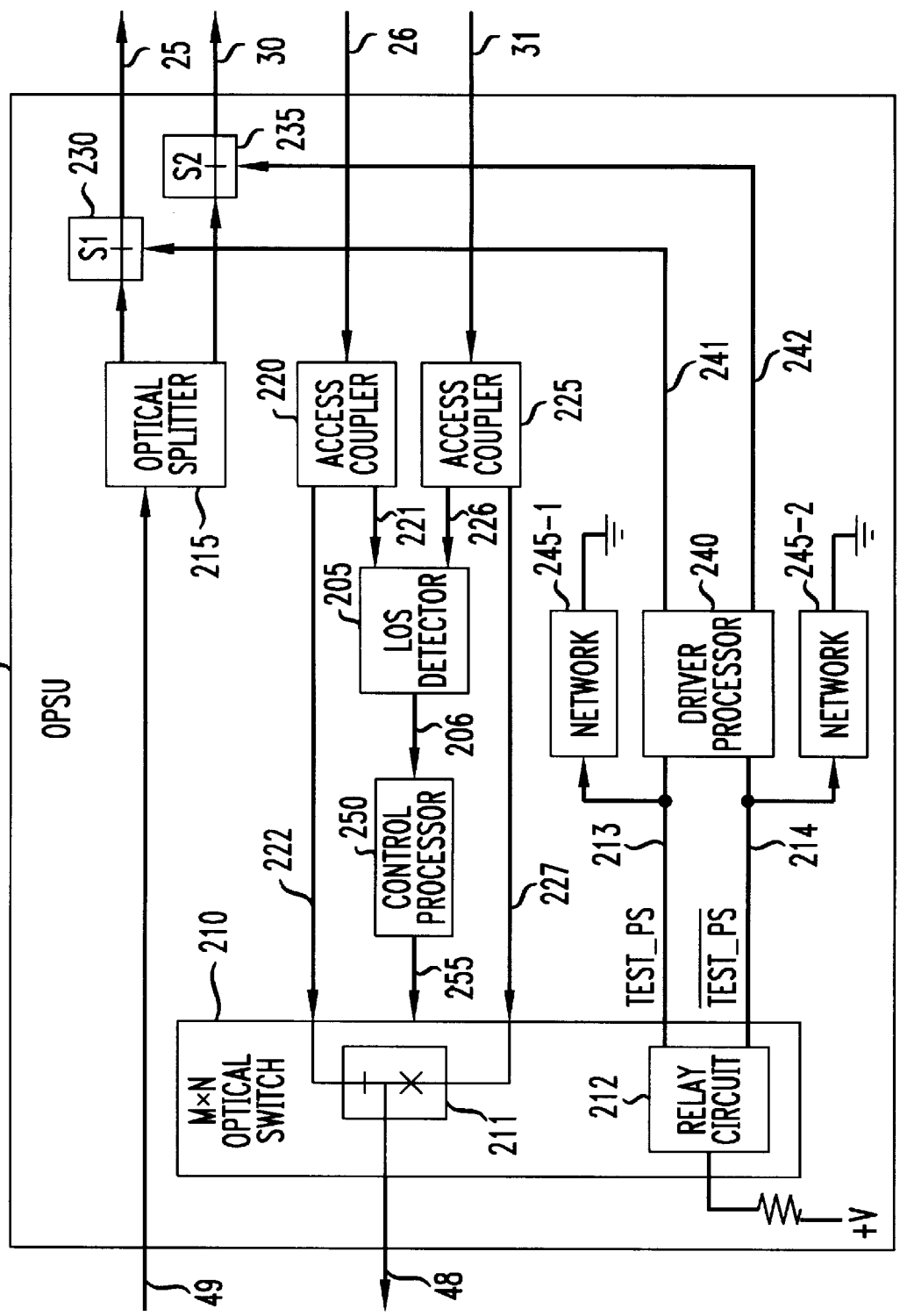
FIG. 2 is a block diagram of the Optical Protection Switch Unit (OPSU) of FIG. 1.

As mentioned above, we deal with that problem by dividing the received power into illustratively two bands, such that one band contains all of the amplified signals and the other band contains only the out-band amplifier noise, in which changes in the power ratio of the two bands are used to identify a LOS condition. Such detection is carried out in an OPSU, a block diagram of which is shown in FIG. 2. It is noted that a discussion of one OPSU, e.g., OPSU 50, equally pertains to the other OPSU, e.g., OSPU 75, and vice-versa. (Note that the term"out-band" will also be referred to herein as"out-of-band").

Turning then to FIG. 2, OPSU 50 includes a conventional optical splitter 215, e.g., a so-called 50—50 splitter, which splits/divides the optical signal received via path 49 between outgoing service path 25 and protection path 30. As mentioned above, the signal supplied to path 25 may be interrupted by opening (operating) conventional optical switch 230 (also designated S1) to cause a LOS at the far end and thus invoke protection switching thereat. Similarly, the system may operate conventional optical switch 235 (also designated S2) to cause the far-end node to switch to the non-protection path (i.e., switch back to paths 25 and 26 if they are available, as will be discussed below in detail).

The signal received from the far end via service path 26, on the other hand, is supplied to access coupler 220, which may be, for example, a conventional optical tap that divides the signal into two unequal portions. The smaller portion, e.g., 1.8%, of the received signal is supplied to LOS detector 205 via optical path 221 for processing. The other portion of the signal received via path 26 is supplied to optical switch 210 via optical path 222. Similarly, the signal received via protection path 31 is supplied to access coupler 225, which is also a conventional optical tap, so that a small portion, e.g., 1.8%, of the protection signal may also be supplied to LOS detector 205 via optical path 226 for processing. The remainder of the protection signal is supplied to optical switch 210. Latchable optical switch 210, whose state is controlled by control processor 250, outputs to path 48 the signal that it receives from one of optical paths 222 or 227.

Accordingly, then, LOS detector 205 determines whether a viable signal is being received via service path 26 (or protection path 31). If not, LOS detector 205 notifies control processor 250 of that fact, which then causes optical switch 210 to switch the signal that is being received via protection path 31 (more precisely the signal on path 227) to path 48. The system then operates switch S1, which may be, for example, a conventional optical switch (represented in the FIG. as a relay contact), to interrupt the signal that is being supplied to outgoing service path 25. The interruption should then cause the OPSU at the other end of transmission path 25 to detect a loss of signal and similarly switch to protection path 30, as mentioned above.

Figure 3:
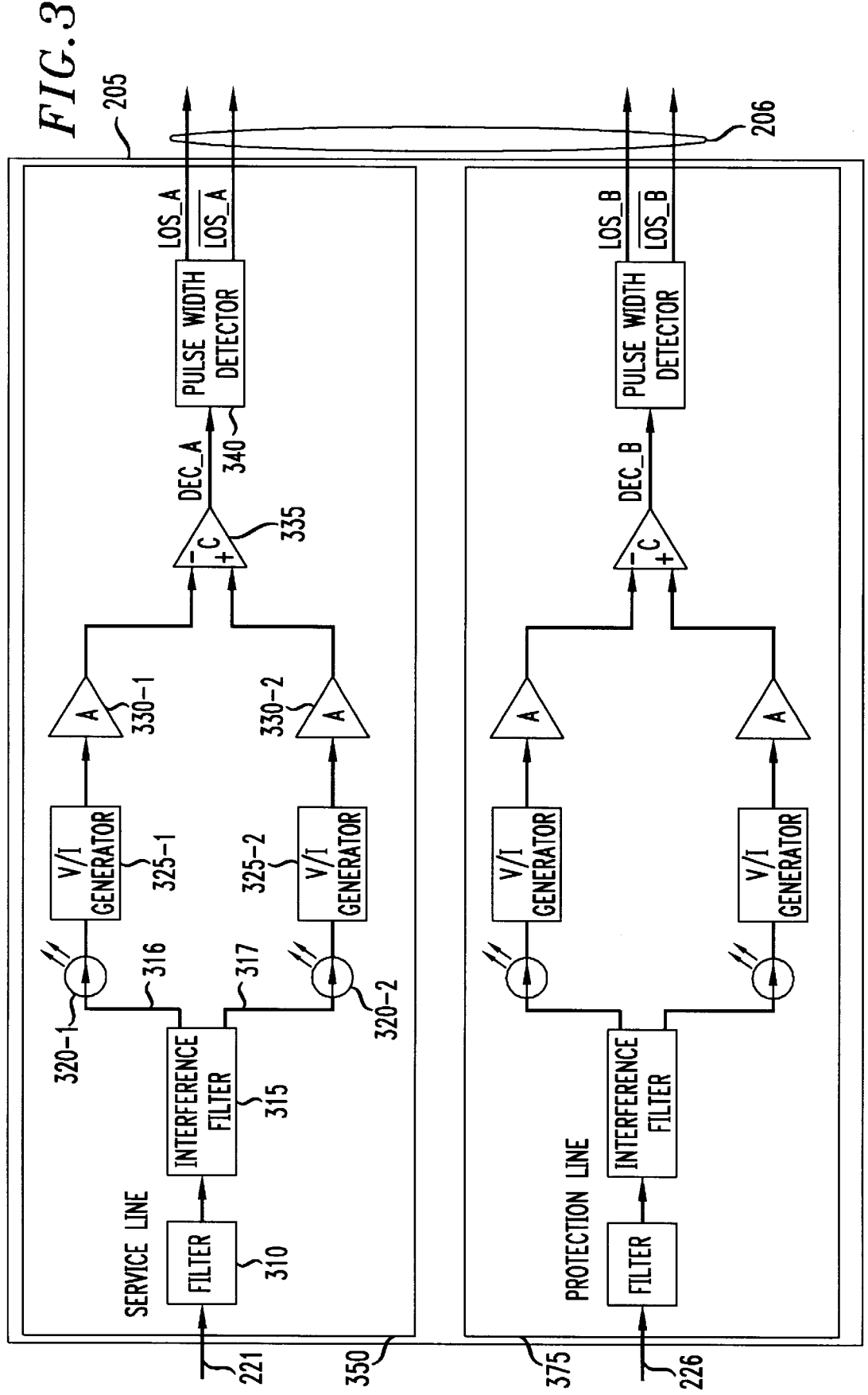
FIG. 3 is a block diagram of the Loss of Signal (LOS) detector of FIG. 2.

A more detailed functional diagram of LOS detector 205 is shown in FIG. 3, and includes processors 350 and 375, which perform similar functions, i.e., the detection of a LOS on paths 26 and 31 (FIG. 1), respectively. A discussion of the way in which one processor operates, e.g., processor 350, thus equally pertains to the other processor, e.g., processor 375, and vice-versa. Turning then to FIG. 3, processor 350, includes filter 310, which may be, for example, a conventional wavelength division multiplexer, to remove a so-called telemetry signal from the signal received via path 221. (Node 150 uses the telemetry signal to send maintenance signals/comnands to node 125.) The remaining signal containing the information channels (if present) is supplied to optical band-pass filter 315, which may be, for example, illustratively the so-called Red-Band WDM WD1515RR filter available from JDS Fitel of Nepean, Ontario, Canada.

Specifically, filter 315 is a device that separates a signal that it receives at its input into an in-band signal and out-of-band signal. The in-band signal is composed of, for example, signals having wavelengths within the range of 1548 nm to 1562 nm (i.e., $\lambda_i$), and the out-of-band signal is composed of signal having wavelengths out of that range. Filter 315 outputs the in-band and out-of-band signals to optical paths 316 and 317, respectively. The inband optical signal is then supplied to photodetector 320-1 which converts the optical energy contained in that signal to an electrical signal (i.e., a current). Photodetector 320-2 performs a similar function with respect to the out-ofband signal outputted to optical path 317. The photo-current outputted by photodetector 320-1 is supplied to a conventional V/A converter 325-1 (e.g., 2 V/mA converter) which converts the current to a voltage level that is then amplified by conventional 1:1 amplifier 330-1. Similarly, the photo-current outputted by photodetector 320-2 is supplied to conventional V/A converter 325-2 (also, e.g., a 2 V/mA converter) which converts that current to a voltage level that is then amplified by conventional 50:1 amplifier 330-2 to equalize the in-band signal with out-of-band signal. In an illustrative embodiment of the invention, the 50:1 ratio sets the threshold for the detection of an LOS. That is, we have recognized that when a LOS is not present, then the level of the in-band-signal approximately is 60 times greater than the level of the outof-band signal. Also, when a LOS is present, then the level of the in-band signal is 40 times greater than the level of the out-of-band signal. We take advantage of that fact and use the output of amplifier 330-2 as a threshold value against which we measure the level of the in-band signal at comparator 335, such that the output of comparator circuit 335 (i.e., DEC_A) is low when the level of the in-band signal supplied by amplifier 330-1 is greater than the out-of-band threshold signal (i.e., the active signal is present) supplied by amplifier 330-2, and is high otherwise.

The signal DEC_A is supplied to pulse width detector 340, which monitors the duration of signal DEC_A whenever the value of that signal has a transition from low to high, e.g., ground to +5 volts. If the duration of a high value of DEC_A persists for a predetermined period time (e.g., an adjustable period of time which we call a "hold-off" delay) between, e.g., zero seconds and 3.2 seconds (i.e., whatever time is desired between those limits) determined by detector 340, then detector 340 concludes that a LOS has occurred and outputs that fact as signals LOS_A and $\overline{LOS\_A}$, which are supplied to control processor 250 with signals LOS_B and $\overline{LOS\_B}$ via path 206.

Figure 4:
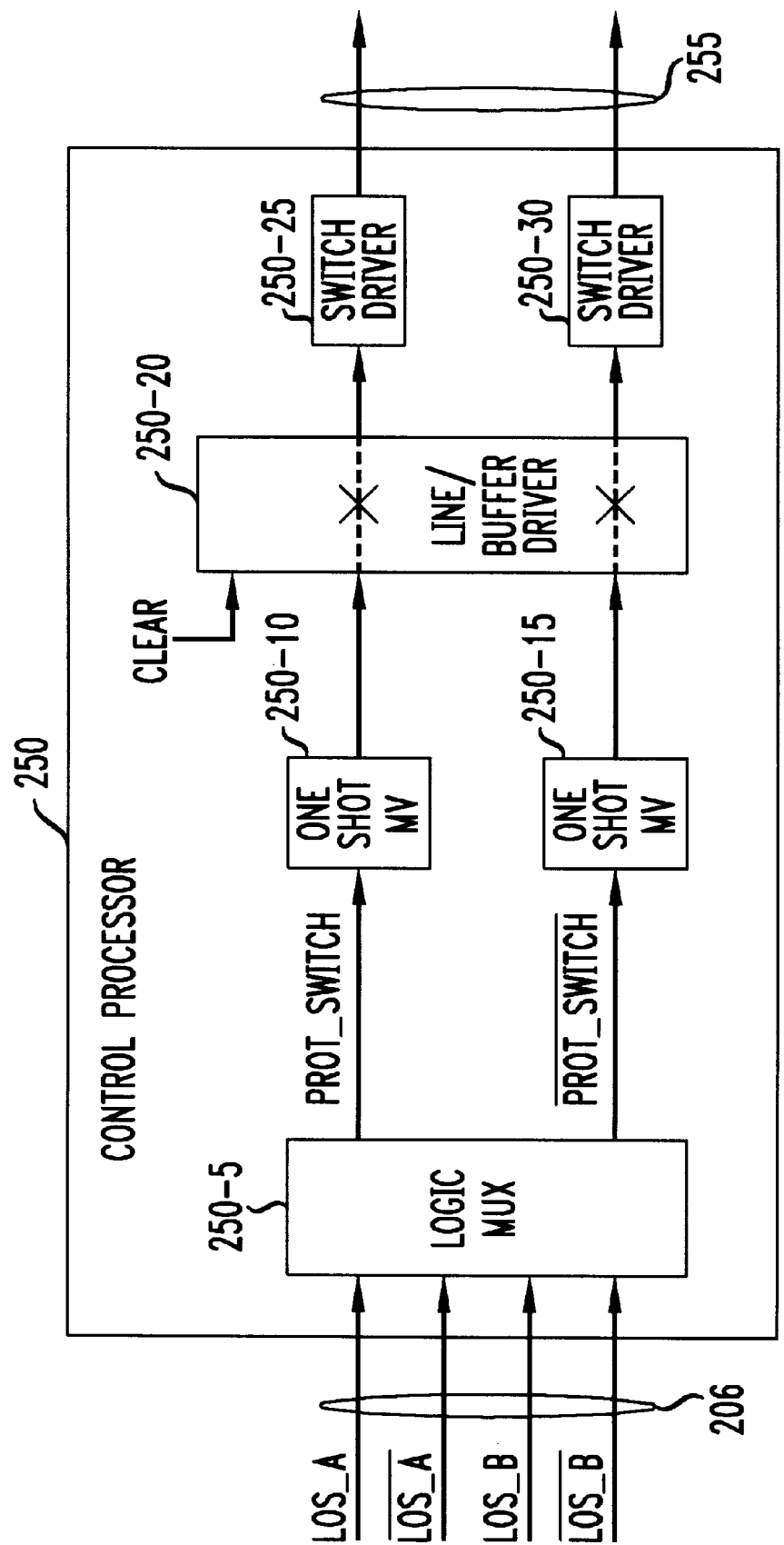
FIG. 4 is a block diagram of the control processor of FIG. 2.

A more detailed functional diagram of control processor 250 is shown in FIG. 4, in which the signals carried via path 206 connect to respective inputs of logic mux 250-5. In an illustrative embodiment of the invention, logic mux 250-5 is combinatorial circuit formed from discrete gates which implements the following logic. (Note, that it may be appreciated that logic mux 250-5 may be easily implemented using a programmed multiplexer, controller (e.g., a 68360 processor, etc.)

If LOS_A and $\overline{\text{LOS\_B}}$ then PROT_SWITCH=HIGH (1)

If LOS_B and $\overline{\text{LOS\_A}}$ then $\overline{\text{PROT\_SWITCH}}$=HIGH (2)

If LOS_A and LOS_B then remain in current state (3)

If $\overline{\text{LOS\_A}}$ and $\overline{\text{LOS\_B}}$ then remain in current state (4)

where logic statement 1 indicates that a LOS occurred on incoming inservice (non-protection) path 26 but not on incoming protection path 31. For that case, the system switches to protection path 31. Logic statement 2 indicates that a LOS occurred on protection path 31, but not incoming service path 26. For that case, the system will switch from the protection path to the service path. Logic statement 3 indicates that a LOS has occurred on both paths 26 and 31. For that case, the system does not switch to either path.

Signals PROT_SWITCH and $\overline{\text{PROT\_SWITCH}}$ are supplied to respective conventional one-shot multivibrators 250-10 and 250-15 each of which outputs a positive going pulse in response to receiving a positive going pulse at its respective input, in which the duration of such a pulse needs to be greater than the time that it takes optical switch 210 (FIG. 2) to operate to switch from one signal path (e.g., path 26) to the other signal path (31). Such a duration may be, e.g., at least 20 milliseconds. The output of a respective one of the one-shots 250-10 and 250-15 is supplied to a respective buffer/driver of circuit 250-20 which provides a buffer between the one-shots and conventional high-current switch drivers 250-25 and 250-30 (e.g., transistors 250-25 and 250-30). That is, buffer/driver 250-20 operates to respectively extend the output of one-shot 250-10 or 250-125 to the switch driver 250-25 or 250-30. A positive pulse at the output of either one-shot 250-10 or 250-15 is thus transferred to a respective buffer/driver of circuit 250-20, which in turn, extends the pulse to a respective one of the conventional optical switch drivers to cause 2×1 optical switch 210 (FIG. 2) to operate. More particularly, a positive pulse at the output of one-shot 250-10 causes driver 250-25 to operate an optical cross-connection in optical switch 210 which disconnects service path 26 from path 48 and connects protection path 31 to path 48. Similarly, a positive pulse at the output of one-shot 250-15 causes driver 250-30 to operate an optical cross-connection in optical switch 210 which disconnects protection path 31 from path 48 and re-connects service path 26 to path 48 (as represented in FIG. 2 by connections 211), in which the foregoing is done all in accordance with the principles of the invention.

Figure 5:
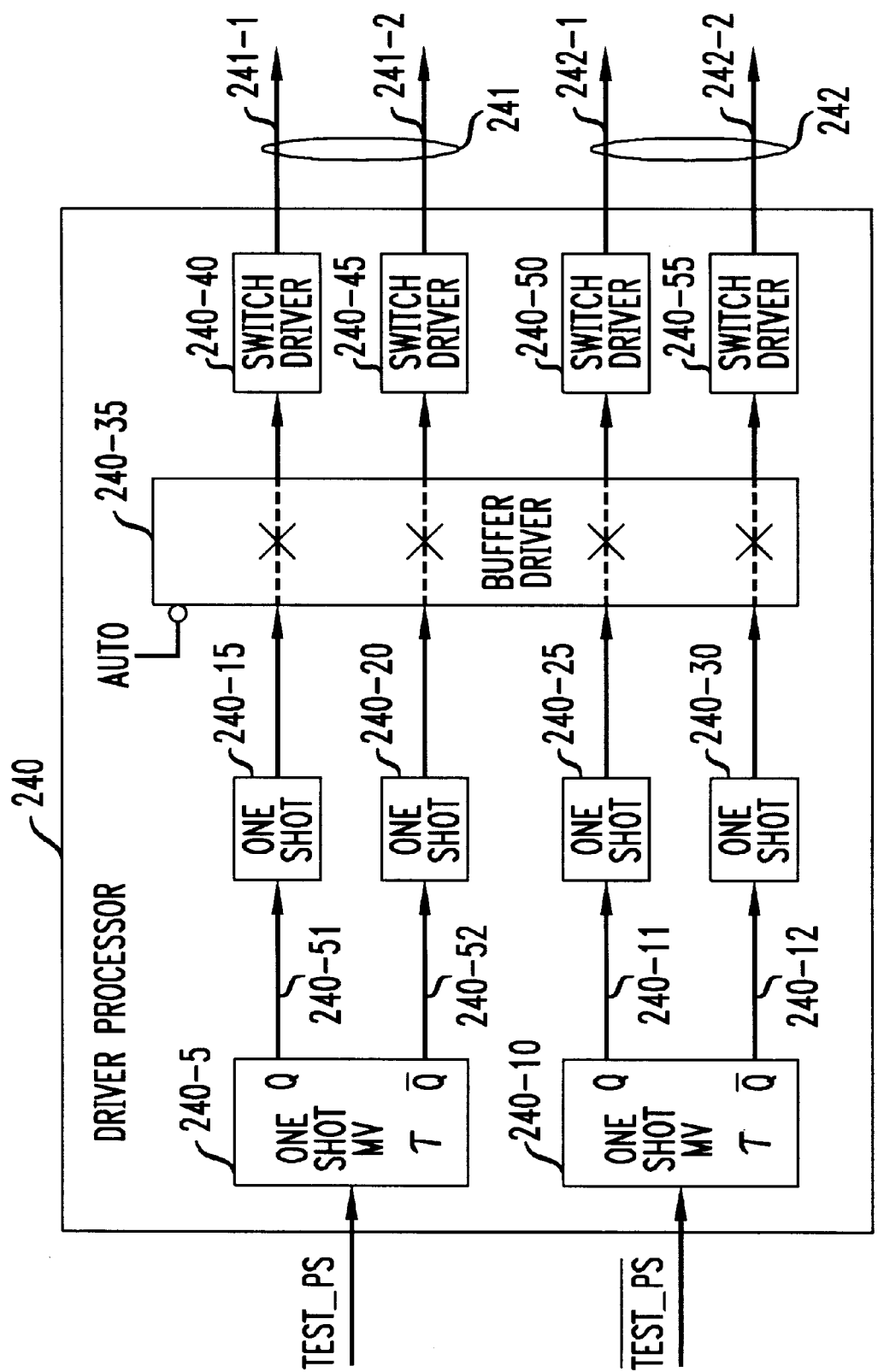
FIG. 5 is a block diagram of the driver processor of FIG. 2.

As is seen from FIG. 2, optical switch 210 includes a conventional relay circuit 212 which, in response to switch driver 250-25 operating optical switch 210, operates in a first way to output a positive signal designated TEST_PS on lead 213 extending to driver processor 240. Note that a conventional RC network 245 is connected to lead 213 (214) to "smooth out" (integrate) contact chatter that occurs when the contacts of relay circuit 212 operate to output signal TEST_PS ($\overline{\text{TEST\_PS}}$). A functional block diagram of driver processor 240 is shown in FIG. 5 and includes one-shot multivibrators 240-5 and 240-10, a plurality of other one-shot circuits 240-15, -20, -25 and -30, buffer driver 240-35 and switch drivers 240-40, -45, -50 and -55.

Specifically, responsive to a presence of signal TEST_PS ($\overline{\text{TEST\_PS}}$), one-shot MV 240-5 (240-10) switches to an active state for a duration of time τ, e.g., a period of time greater than a so-called hold-off delay that is required by pulse width detector 340, FIG. 3. In an illustrative embodiment of the invention, the value of τ is set to four seconds to ensure that the value of τ will be greater than the hold-off delay, even if the delay is increased somewhat. (Thus, one-shot 240-5 is activated when (a) an LOS occurs on the service path, (b) that path is in service, i.e., connected to path 48, FIG. 1, and (c) the protection path is available for service.) When one-shot 240-5 (240-10) switches to an active state, its Q output goes high (e.g., to +5 v) and its $\overline{Q}$ goes low (e.g., to ground) for the duration of τ. The high going pulse on lead 240-51 triggers one-shot 240-15 which outputs a positive going pulse having a duration of, for example, twenty milliseconds, to buffer/driver 240-35, which similarly provides a buffer function between one-shot 240-15 and switch 240-40.

As mentioned above, when switch 230 (S1) operates it disrupts the signal carried over path 25, thereby causing the opposite end node, e.g., node 150, to declare a LOS over path 25 and switch to the protection path. At the end of the twenty millisecond period, one-shot 240-15 returns to its original state, thereby causing switch driver 240-40 to release. Optical switch 230, however, remains operated. At the end of duration τ, the Q and $\overline{Q}$ outputs of one-shot MV 240-5 return to their original (or opposite) logic states, which means that the $\overline{Q}$ output extending to one shot 240-20 via lead 240-52 returns to a high level e.g., +5 volts. The positive going transition at $\overline{Q}$ causes one-shot 240-20 to change state and output a positive pulse having a duration of, for example, twenty milliseconds. That output pulse is similarly buffered by buffer/driver 240-35 and then extended to switch driver 240-45 causing driver 240-45 to operate and reset switch 230 and return switch 230 to its original state. At the end of twenty milliseconds, one-shot 240-20 returns to its original state, thereby releasing switch driver 240-45. Note that one-shot MV 240-10, one-shot circuits 240-25 and 240-30, buffer/driver 240-35 and switch drivers 240-50 and 240-55 cooperate in a similarly manner when (a) a LOS has been detected on the protection path, (b) that path is in service (i.e., has been connected to path 48) and (c) the service path (25 and 26) is available for service, as determined by the foregoing. In that case, switch driver 240-50 operates for twenty milliseconds and, in turn, operates optical switch 235 (S2) to disrupt the signal carried over protection path 30 and, thus cause the opposite end, e.g., node 150, to switch to the original service line. Also, when one-shot MV 240-10 returns to its original state, switch driver 240-55 will similarly operate for twenty milliseconds and reset optical switch 235.

The foregoing is merely illustrative of the principles of the invention. Those skilled in the art will be able to devise numerous arrangements, which, although not explicitly shown or described herein, nevertheless embody those principles that are within the spirit and scope of the invention. For example, the foregoing discussed the invention in the context of a service line and protection line for the purposes of clarity and conciseness. In fact, there is no such distinction between the bi-directional paths. To say it another way, the path that is in service may be called herein the active path and the out-of-service path may be called herein the standby path (protection path). As a further example, the foregoing was discussed in the context of what is commonly referred to as a 1+1 protection switching system. It is clear that the LOS detector may be readily used in other types of protection switching systems, for example, a 1×N protection switching system, in which one protection line/path protects anyone of N active lines, where N>1.

We claim:

1. An optical communications node having first and second bi-directional communications paths respectively serving as a service path and protection path, said node further comprising:

an optical protection switching unit that filters signals respectively received over the service and protection paths to generate in-band and out-of-band signals for each of the paths, equalizes the out-band-signals relative to the in-band signals, and compares the equalized version of the out-of-band signals with the in-band signals, wherein said optical protection unit includes control apparatus that invokes protection switching when the result of the comparison indicates that the equalized version of the out-band signals is greater than the in-band signals and such result occurs for a predetermined duration of time.

2. The optical switching unit of claim 1 wherein the level of the equalized out-of-band signal is supplied to the comparator as threshold value to measure the relative level of the in-band signal.

3. The optical switching unit of claim 1 wherein the control unit further comprises apparatus that generates a Loss of Signal (LOS_B) in the event that the level of the equalized out-of-band signal derived from the signal received via the protection path exceeds the level of the in-band signal also derived from the signal received via the protection path and, responsive to the presence of the LOS_B signal restores the service path to service if it is available for service.

4. The optical switching unit of claim 3 further comprising a logical multiplexer that (a) if a LOS_A state and a $\overline{\text{LOS\_B}}$ state are present, outputs an indication to switch to the protection path (b) if the LOS_B state and a $\overline{\text{LOS\_A}}$ state are present, outputs an indication to switch to the service path if it is available, or (c) if either (a) the LOS_A state and LOS_B state are present; or (b) the $\overline{\text{LOS\_A}}$ state and $\overline{\text{LOS\_B}}$ state are present, outputs an indication not switch to either path.

5. The optical switching unit of claim 3 further comprising apparatus, responsive to switching to the service path from the protection path, for causing a node connected at the opposite ends of the first and second bi-directional communications path to switch to the service path.

6. The optical switching unit of claim 1 further comprising apparatus, responsive to effecting protection switching, for causing a node connected at the opposite ends of the first and second bi-directional communications path to switch to the protection path.

7. The optical switching unit of claim 1 wherein the optical communications node is 1+1 optical line system.

8. The optical switching unit of claim 1 wherein the optical communications node is 1×N optical line system.

9. Apparatus for detecting a loss of signal on an in-service optical communications path comprising, a filter that generates from an optical signal received via the in-service optical communications path an in-band signal and an out-of-band signal, a plurality of optical signal converters that respectively convert the in-band and out-of-band signals to electrical signals, amplifier apparatus that equalizes the level of the converted out-of-band signal relative to the level of the converted in-band signal, a comparator that uses the level of the converted, equalized out-of-band signal as a threshold to determine if the level of the converted in-band signal exceeds the level of the converted, equalized out-band signal, and apparatus that generates a Loss of Signal (LOS_A) indication for the service path if the level of the converted in-band signal does not exceed the threshold value.

10. The apparatus of claim 9 further comprising control circuitry that, responsive to a presence of the LOS_A indication, switches communications from the optical communications in-service path to an optical communications protection path.

11. The apparatus set forth in claim 10 further comprising another filter that generates from an optical signal received via optical communications protection path an in-band signal and an out-of-band signal, another plurality of optical signal converters that respectively convert the latter in-band and out-of-band signals to electrical signals, other amplifier apparatus that equalizes the level of the converted out-of-band signal relative to the level of the converted in-band signal, another comparator that uses the level of the converted, equalized out-of-band signal as a threshold to determine if the level of the converted in-band signal exceeds the level of the converted, equalized out-of-band signal, and apparatus that generates a Loss of Signal (LOS_B) indication for the service path if the level of the converted in-band signal does not exceed the threshold value.

12. The apparatus of claim 11 further comprising restoration apparatus, responsive to the LOS_B indication, for restoring the optical communications service path to service if it is available for service.

13. The apparatus of claim 12 further comprising a logical multiplexer that (a) if the LOS_A indication and a $\overline{\text{LOS\_B}}$ indication are present, switches to the protection path (b) if the LOS_B indication and a $\overline{\text{LOS\_A}}$ indication are present, switches to the service path if it is available, or (c) if the LOS_A indication and LOS_B indication are present, does not switch to either path.

14. The apparatus of claim 13 further comprising switching apparatus, responsive to the invoking of protection switching for causing a node connected at the opposite end of the in-service optical communications path to switch to the protection path.

15. The optical switching unit of claim 14 further comprising switching apparatus, responsive to switching to the service path from the protection path, for causing a node connected at the opposite ends of the first and second bi-directional communications path to switch to the service path.

16. The apparatus of claim 12 further comprising a logical multiplexer that (a) if the LOS_A indication and a $\overline{\text{LOS\_B}}$ indication are present, switches to the protection path (b) if the LOS_B indication and a $\overline{\text{LOS\_A}}$ indication are present, switches to the service path if it is available, or (c) if the $\overline{\text{LOS\_A}}$ indication and $\overline{\text{LOS\_B}}$ indication are present, does not switch to either path.

* * * * *